United States Patent
Chen et al.

(10) Patent No.: US 6,701,598 B2
(45) Date of Patent: Mar. 9, 2004

(54) JOINING AND FORMING OF TUBULAR MEMBERS

(75) Inventors: Chih-Chang Chen, Rochester Hills, MI (US); Chi-Mou Ni, Washington, MI (US); Peter A. Tropper, Macomb, MI (US); Daniel C. Hutchinson, Goodrich, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/125,947

(22) Filed: Apr. 19, 2002

(65) Prior Publication Data

US 2003/0196307 A1 Oct. 23, 2003

(51) Int. Cl.⁷ .......................... B23P 17/00; B21D 39/00
(52) U.S. Cl. .......................... 29/421.1; 29/506; 29/507; 29/516
(58) Field of Search ................ 29/421.1, 506, 29/507, 509, 516; 228/56.3, 223, 15.1, 126, 208

(56) References Cited

U.S. PATENT DOCUMENTS

| | | | |
|---|---|---|---|
| 4,923,110 A | * 5/1990 | Carmichael et al. | 228/214 |
| 5,720,092 A | 2/1998 | Ni et al. | 29/421.1 |
| 6,164,517 A | * 12/2000 | Kim | 228/56.3 |
| 6,183,013 B1 | 2/2001 | Mackenzie et al. | 280/797 |

FOREIGN PATENT DOCUMENTS

GB 233104 * 4/1999

* cited by examiner

*Primary Examiner*—John C. Hong
(74) *Attorney, Agent, or Firm*—Laura C. Hargitt

(57) ABSTRACT

The present invention is for a method of lap joining two tubular members and then hydroforming the tubular assembly. An insert end of the first tubular member is inserted into a receiver end of the second tubular member to form a lap joint. A filler metal ring is placed about the outer periphery of the insert end so that it is adjacent the opening of the receiver end of the second tubular member. Heat is applied to braze or solder the lap joint, forming a tubular assembly. The tubular assembly is then hydroformed during which time a supplementary mechanical lock may be formed in the lap joint.

10 Claims, 3 Drawing Sheets

JOINING AND FORMING OF TUBULAR MEMBERS

TECHNICAL FIELD

This invention relates generally to forming tubular parts in a lap joint. More specifically, this invention relates to a method of joining the tubes by a soldering/brazing method and hydroforming the assembly.

BACKGROUND OF THE INVENTION

Automobiles, and other such motor vehicles, often include a frame and body assembly comprising several unique structures and/or shapes. In the past, vehicle body structures comprised panel and frame members, usually metallic such as steel. Steel has typically been used because of its relatively high strength, low cost and the ease by which it can be shaped into frame members or body panels. Recent studies have developed vehicular body structures that include relatively lighter materials, such as aluminum or magnesium, and/or irregularly shaped, thin-walled hydroformed structures that are designed to reduce the number of parts and the overall weight of the automobile.

The driving force for the introduction of hydroformed parts into the automotive industry is the desire to reduce the manufacturing cost and weight by consolidating parts. In a typical tubular space-frame application, hydroformed components are joined together to construct a tubular structure assembly. Another method for constructing a vehicle space-frame, discussed in U.S. Pat. No. 5,720,092 and assigned to the present assignee, involves hydroforming a pre-joined tubular structural assembly to achieve its final configuration. For both applications, a tube-to-tube lap joint is commonly used and critical to the success of such tubular space frames.

Traditional joining methods, prior to hydroforming, include fusion welding processes such as TIG, MIG, and laser welding. These processes may have drawbacks when applied to the tube-to-tube lap joint. For example, most arc welding processes involve a point heat source which normally requires more than one minute to travel around the tube to complete a circumferential joint. The time increases with larger diameter tubes. Laser welding is a faster mode, but is more expensive. Further most fusion welding processes, including laser welding, are sensitive to issues such as penetration, burn-through, clearance, and fit-up. The application of welding heat to relatively small areas of the thin-walled bulky structures often produces distortion of the parts at the weld region. This distortion can occur in the joining of steel parts but is particularly problematic in the joining of lower melting, lighter weight parts, such as those of aluminum or magnesium alloys. Moreover, these processes are sensitive to porosity caused by the presence of zinc coating on galvanized steel tubes. This may lead to potential leak paths during post-joining hydroforming of the tubes.

Thus, it is an object of the present invention to provide a new method for joining tubular components in a water-tight lap joint. It is a further object to employ such a method that utilizes lower temperatures and less heat so as to minimize distortion of metal in the region of the lap joint. Such a method would have particular utility in joining thin-walled tubular members, which can then be hydroformed.

SUMMARY OF THE INVENTION

This invention provides a joining process for securing two tubular members in a lap joint configuration, followed by a hydroforming process, which may include forming a supplementary mechanical lock in the lap joint.

In accordance with the invention, an insert end of a first tubular member is inserted within a receiver end of a second tubular member. A brazing/soldering process is employed to rapidly heat up the tubular joint area to elevated temperatures by induction/flame heating such that a metallic bond is formed between the tubes via the capillary action of the filler metal melted at the elevated temperature.

The brazing/soldering process provides a metallurgical bond between the overlapped tubes by wetting action at lower temperatures than the melting point of the tube base metal, which minimizes the risk of burn-through or lack of penetration. Certain brazing/soldering filler metals can alloy with galvanized coatings on the tubes and form the joint at temperatures much lower than zinc evaporation temperature; therefore zinc vapor porosity formed in many arc welding processes would not occur. Since heat is delivered uniformly across the joint area, the cycle time may be as short as 20 seconds and less heat distortion results than is usually encountered in welding thin-walled tubular parts in a lap joint.

Once a brazed/soldered joint is formed, the tubular assembly is then hydroformed into a final shape. During hydroforming, a supplementary mechanical lock may be created in the lap joint. The mechanical lock may take several forms such as an outward protrusion, an inward protrusion or a combination thereof. This provides additional integrity and strength to the lap joint.

Other objects and advantages of this invention will become apparent from a detailed description of specific embodiments that follow.

DESCRIPTION OF THE PREFERRED EMBODIMENT

This invention provides a new method of forming a tubular member assembly. Such members are often used in the manufacture of a vehicle body frame. Obviously, the joint must provide suitable strength. A lap joint between adjoining sections of a frame rail in a vehicle is illustrative of a typical lap joint in vehicle manufacture.

Figure 1:
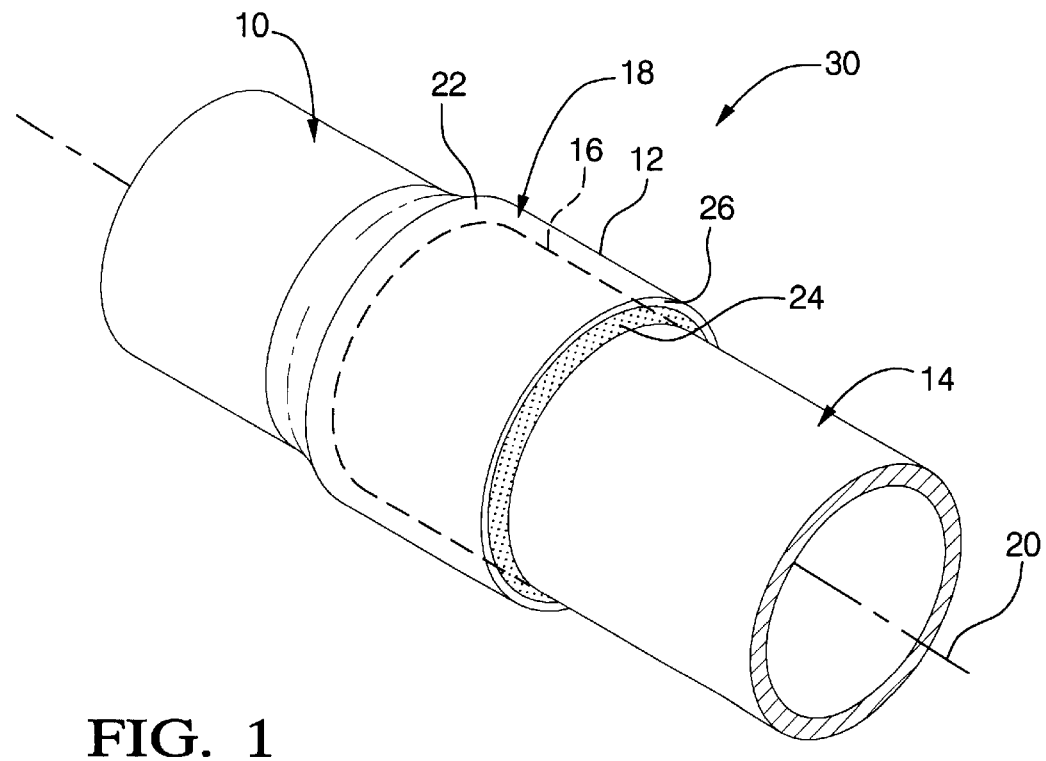
FIG. 1 illustrates two tubular members prior to joining and hydroforming in accordance with the present invention.

FIG. 1 illustrates a receiver tube member 10 having a receiver end 12 and an insert tube 14 having an insert end 16, inserted in the receiving end. The joint that is formed thusly is referred to as a lap joint 18, where the receiver and insert ends 12, 16 overlap, and is made to join the two tubular members 10, 14 along a common longitudinal axis 20. The insert and receiver ends 12, 16 have a common cross section with a dimensional annular gap 22 therebetween (e.g. 0.005–0.008 inches).

The tubes 10, 14 are then metallurgically bonded by either soldering or brazing the lap joint 18. To accomplish this, flux paste and a filler metal ring 24 is placed about the outer periphery of the insert end 16 of the insert tube 14 prior to mating the tubes. Thus when the insert end 16 is inserted, the filler metal ring 24 is positioned adjacent the opening 26 to the receiver end 12.

Heat is then applied to the frame assembly by application of a heat source, such as a torch or induction heating. When the melting temperature of the filler metal 24 is reached, the filler metal is melted into the dimensional gap 22 of the joint area. As a result of capillary attraction, the molten filler material flows into gap 22 between the outer surface of the insert end 16 and the inner surface of the receiver end 12, and is consequently distributed between the closely fitted-surfaces of the joint 18.

In general, the method of brazing comprises the application of heat to join two structures. The brazing technique is analogous to that of welding but is performed at temperatures that will mitigate deformity of the vehicle body part. Brazing joins materials by heating them in the presence of a braze alloy while having a liquidus temperature above 450° C. but below the solidus temperature of the base material(s) used. Since melting of the base material is not involved and the peak temperature is controllable, the brazing process reduces the residual stress and distortion of the components. This is also true for soldering which involves the same process as brazing but with filler metals having a liquidus temperature below 450° C. In either case the liquidus temperature of the selected filler metal is below the solidus temperature of the base materials of the joining tubes. The suggested braze metal for this embodiment is a silver-copper-zinc base alloy for brazing steel. In the process of brazing steel with a silver-copper-zinc alloy, a white flux is generally used. Since capillary attraction between the steel and the filler material is much higher than that between the steel and the flux, the flux is displaced by filler material. The suggested solder metal is tin-zinc alloy for steel.

To achieve sound joints, various process variables (e.g., heating temperature, time, thickness of the filler material, cleaning of joint surfaces, and gap between the parts) for each application need to be tested and tried.

Brazing/soldering the tubes 10, 14 together should provide a water tight lap joint 18 such that the resulting tubular assembly 30 may undergo hydroforming to shape the final assembly. Hydroforming creates a final cross sectional shape matching that of the surface of the mating dies. Often round tubes are hydroformed to square or rectangular cross sections. In a preferred embodiment, a supplementary mechanical lock is formed, by action of hydroforming, in the lap joint 18 to further ensure strength and integrity of the joined tubes.

Figure 2:
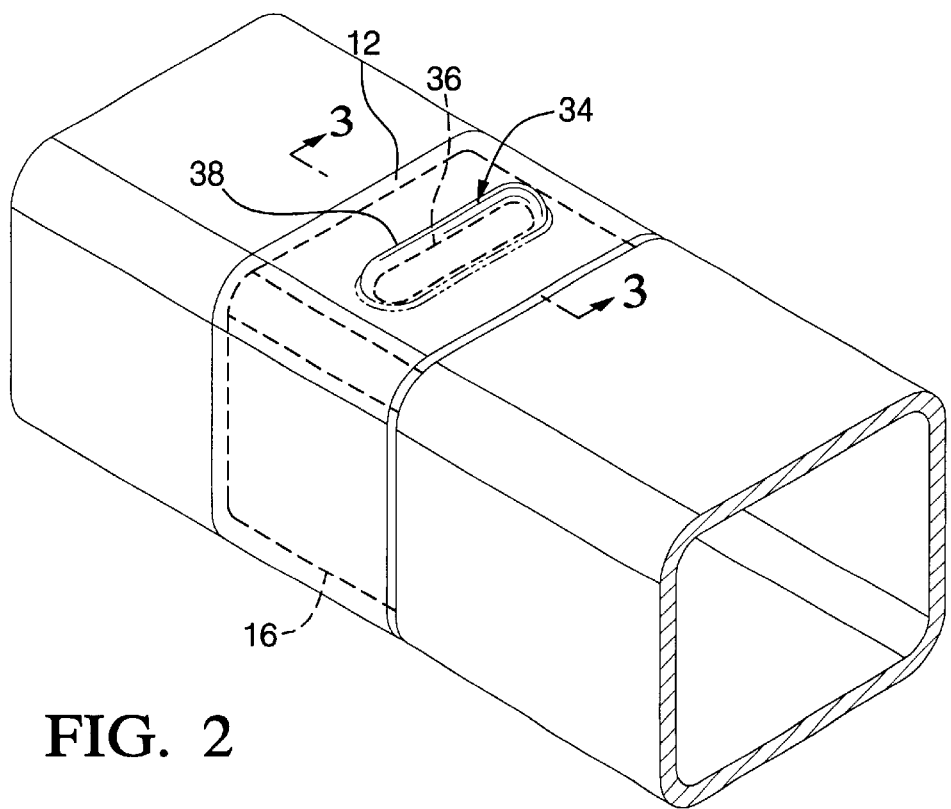
FIG. 2 is a brazed/soldered lap joint with an outward mechanical lock created during hydroforming.
Figure 3:
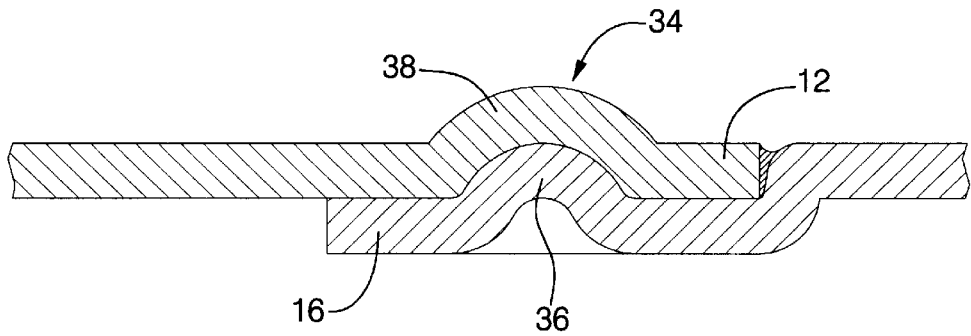
FIG. 3 is a longitudinal cross section 3—3 of FIG. 2.
Figure 4:
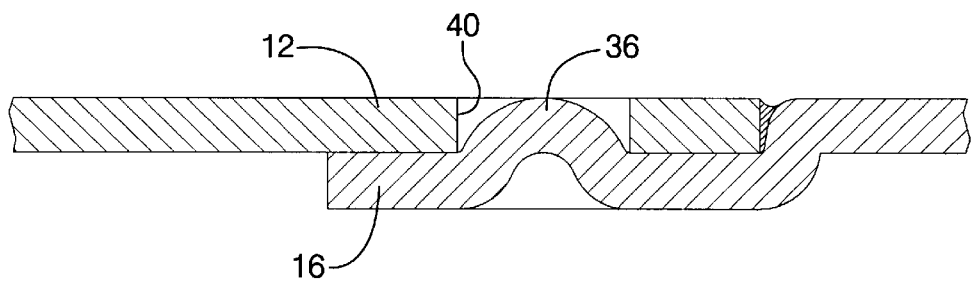
FIG. 4 is a cross section of a variation of the outward mechanical lock shown in FIGS. 2 and 3 which includes pre-existing holes in the receiver end.

In a first embodiment illustrated in FIGS. 2 and 3, an outward mechanical lock 34 is formed in the lap joint 18. One of the hydroform dies includes a pocket, or concave recess, not shown, in which the water pressure forces a portion 36 of the insert end, and thus the radially adjacent portion 38 of the receiver end, radially outward into the pocket. Such a discrete lock creates an interference, which prevents relative axial motion between the receiver and insert tubes 10, 14. One or more outwardly protruding mechanical locks 34 may be formed in the lap joint 18. Preferably multiple locks are formed to provide balance and additional locking action for additional joint integrity. A variation of the outward mechanical lock is shown in FIG. 4 where a portion 36 of the insert end is pressed radially outward through a radially adjacent aperture 40 in the receiver end 12.

Figure 5:
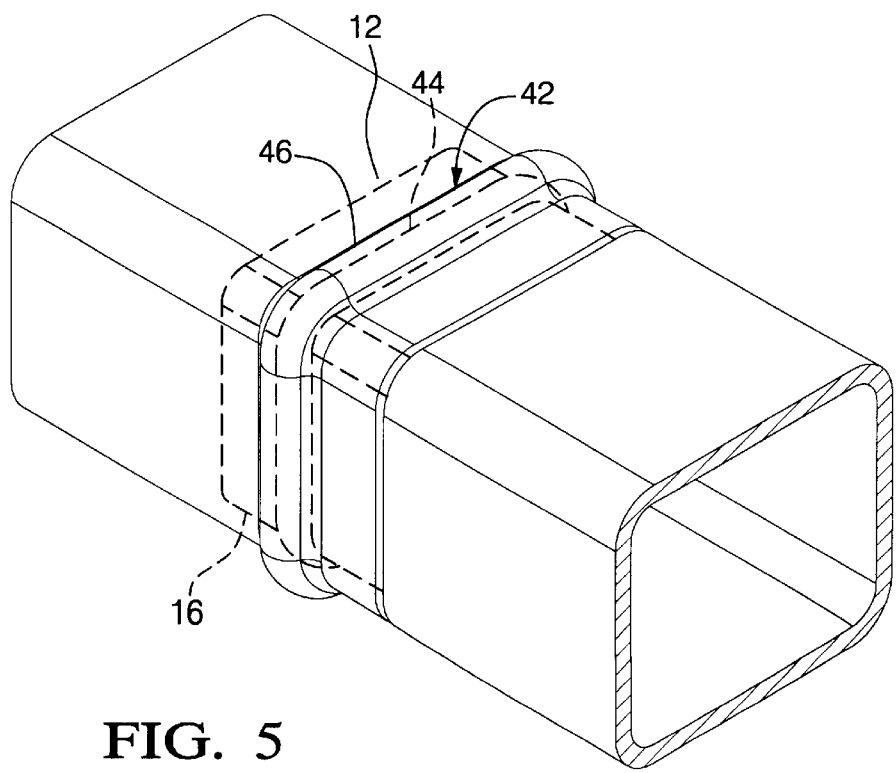
FIG. 5 is a brazed/soldered lap joint with an outward peripheral mechanical lock created during hydroforming.

In another embodiment shown in FIG. 5, the outward mechanical lock may be considered an outward peripheral lock 42. The dies include a peripheral recess. Thus the water pressure forces a peripheral ring 44 of the insert end 16 radially outward, which deforms a radially adjacent peripheral ring 46 of the receiver end 12 out to the die recess. This creates an axial interference between the joined ends.

Figure 6:
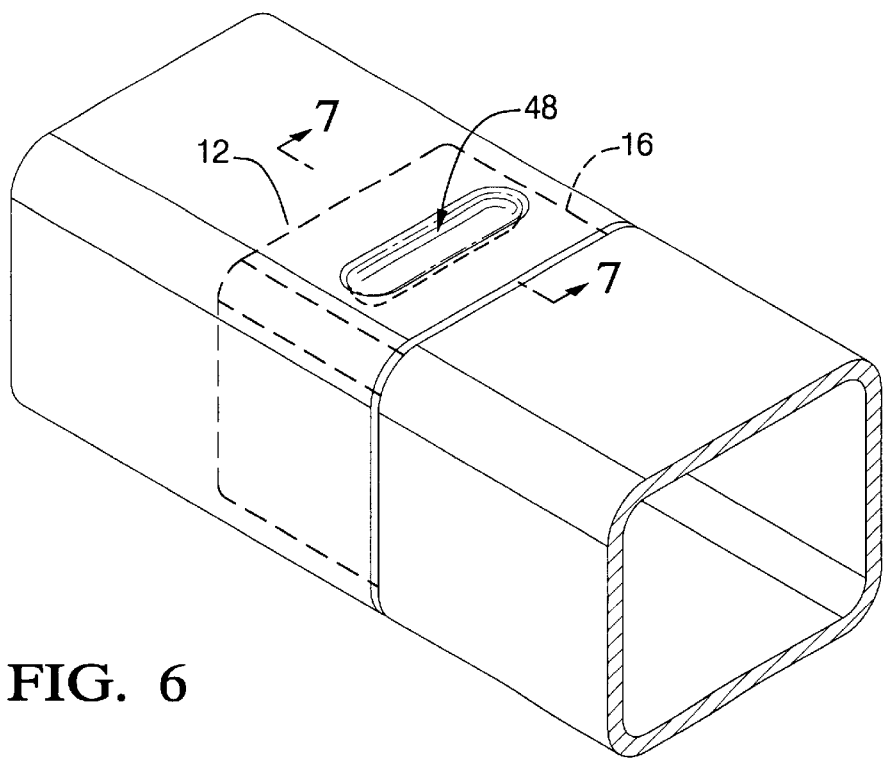
FIG. 6 is a brazed/soldered lap joint with an inward mechanical lock created during hydroforming.
Figure 7:
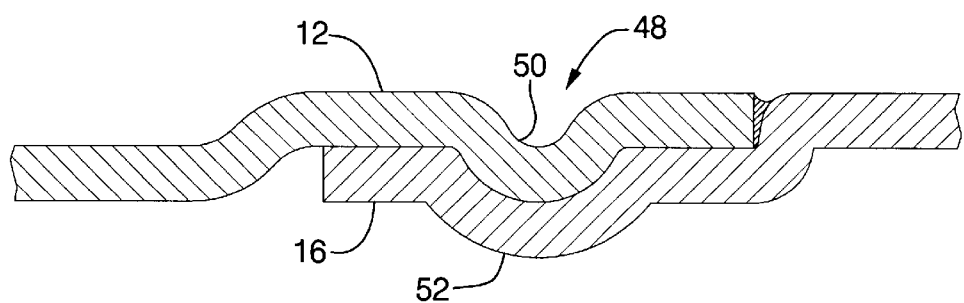
FIG. 7 is a longitudinal cross section 7—7 of FIG. 6.

In the instance where a flush surface is desired on the tubular assembly 30 (i.e. no outward protrusion), an inward mechanical lock 48 may be formed in the lap joint 18 as illustrated in FIGS. 6 and 7. One of the hydroform dies includes a convex surface or protrusion. In this case, the die convex surface holds a portion 50 of the receiver end 12 radially inward, which holds a radially adjacent portion 52 of the insert end 16 inward from the balance of the receiver and insert ends, which are forced radially outward. This forms an inward mechanical lock 48. One or more inward mechanical locks may be formed in the lap joint.

Figure 8:
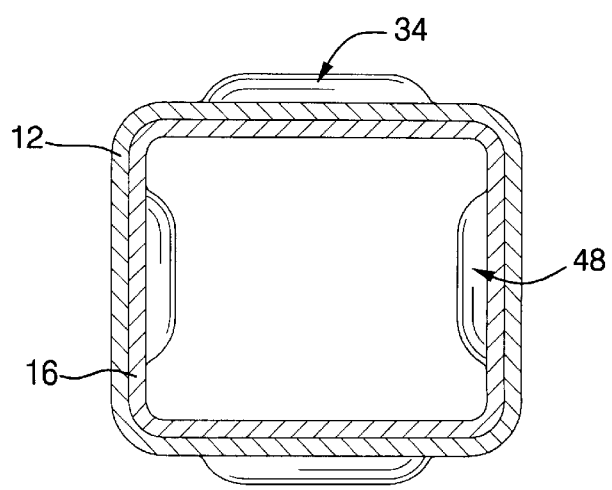
FIG. 8 is a transverse cross section through a lap joint having both inward and outward mechanical locks.

Further a combination of inward and outward mechanical locks may be formed in the lap joint via the hydroforming step of forming the final tubular assembly. As described above, the hydroform press would include both concave and convex die surface portions to form the outward and inward mechanical locks 34, 48 respectively as illustrated in the cross section of FIG. 8.

While the invention has been described in the context of the preferred embodiments, it is not intended to be limited to the above description, but rather only to the extent set forth in the following claims.

What is claimed is:

1. A method of forming a lap joint between an insert end of a first sheet metal tubular member and a receiver end of a second sheet metal tubular member, said method comprising:
   inserting the insert end of the first tubular member into an opening in the receiver end of the second tubular member and having an annular gap therebetween;
   positioning a filler metal ring about the outer periphery of the insert end, adjacent the opening of the receiver end of the second tubular member;
   brazing the lap joint to form a tubular assembly;
   hydroforming the tubular assembly after the brazing step wherein the hydroforming step includes:
   forming a supplementary mechanical lock in the lap joint by action of the hydroforming step.

2. A method as recited in claim 1, wherein the step of forming the supplementary lock comprises the step of:
   pressing a portion of the insert end radially outward through a radially adjacent aperture in the receiver end of the second tubular member.

3. A method as recited in claim 1, wherein the step of forming the supplementary lock comprises the step of:
   pressing a portion of the insert end radially outward to thereby press a radially adjacent portion of the receiver end outward to form an outward mechanical lock.

4. A method as recited in claim 1, wherein the step of forming the supplementary lock comprises the step of:
   pressing a peripheral ring of the insert end radially outward to thereby press a radially adjacent peripheral ring of the receiver end outward to form an outward peripheral mechanical lock.

5. A method as recited in claim 1, wherein the step of forming supplementary lock comprises the step of:
holding a portion of the receiver end and a radially adjacent portion of the insert end radially inward from the receiver and insert ends to form an inward mechanical lock.

6. A method as recited in claim 1, wherein the step of forming the supplementary lock comprises the steps of:
holding a first portion of the receiver end and a radially adjacent first portion of the insert end radially inward from the receiver and insert ends to form an inward mechanical lock; and
pressing a second portion of the insert end radially outward to thereby press a radially adjacent second portion of the receiver end outward to form an outward mechanical lock.

7. A method of forming a lap joint between an insert end of a first sheet metal tubular member and a receiver end of a second sheet metal tubular member, said method comprising:
inserting the insert end of the first tubular member into an opening in the receiver end of the second tubular member and having an annular gap therebetween;
positioning a filler metal ring about the outer periphery of the insert end, adjacent the opening of the receiver end of the second tubular member;
soldering the lap joint to form a tubular assembly;
hydroforming the tubular assembly after the soldering step wherein the hydroforming step includes:
forming a supplementary mechanical lock in the lap joint by action of the hydroforming step.

8. A method as recited in claim 7, wherein the step of forming the supplementary lock comprises the steps of:
pressing a portion of the insert end radially outward to thereby press a radially adjacent portion of the receiver end outward to form an outward mechanical lock.

9. The method as recited in claim 7, wherein the step of forming the supplementary lock comprises the step of:
holding a portion of the receiver end and a radially adjacent portion of the insert end radially inward from the receiver and insert ends to form an inward mechanical lock.

10. A method as recited in claim 7, wherein the step of forming the supplementary lock comprises the step of:
holding a first portion of the receiver end and a radially adjacent first portion of the insert end radially inward from the receiver and insert ends to form an inward mechanical lock; and
pressing a second portion of the insert end radially outward to thereby press a radially adjacent second portion of the receiver end outward to form an outward mechanical lock.

* * * * *